(12) United States Patent
Brown et al.

(10) Patent No.: US 6,722,261 B1
(45) Date of Patent: Apr. 20, 2004

(54) HYDRAULIC PISTON POSITION SENSOR SIGNAL PROCESSING

(75) Inventors: Gregory C. Brown, Chanhassen, MN (US); James A. Johnson, Savage, MN (US); Eric R. Lovegren, Big Lake, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 10/316,777

(22) Filed: Dec. 11, 2002

(51) Int. Cl.[7] .............................................. F01B 25/26
(52) U.S. Cl. ................................ 92/5 R; 91/1; 324/642
(58) Field of Search ........................ 91/1, 361; 92/5 R; 60/459; 324/642

(56) References Cited

U.S. PATENT DOCUMENTS

| | | | |
|---|---|---|---|
| 3,160,836 A | 12/1964 | Farley | 336/30 |
| 3,714,846 A | 2/1973 | Louis et al. | 74/687 |
| 3,744,344 A | 7/1973 | Olsen et al. | 74/687 |
| 3,796,111 A | 3/1974 | Schauer | 74/687 |
| 3,903,756 A | 9/1975 | Hamma | 74/687 |
| 4,019,404 A | 4/1977 | Schauer | 74/687 |
| 4,126,047 A | 11/1978 | Sethares et al. | 73/505 |
| 4,138,907 A | 2/1979 | Melles | 74/687 |
| 4,259,881 A | 4/1981 | Meyerle | 74/687 |

(List continued on next page.)

FOREIGN PATENT DOCUMENTS

| | | |
|---|---|---|
| DE | 31 16333 A1 | 4/1981 |
| DE | 4220333 | 12/1993 |
| DE | 43 11 084 | 9/1994 |
| DE | 94 17 204.8 | 10/1994 |
| DE | 29616034 | 2/1997 |
| EP | 0 266 606 A2 | 10/1987 |
| EP | 0 444 472 A2 | 2/1991 |
| GB | 2 172 995 A | 10/1986 |
| WO | WO 98/23867 | 6/1998 |

OTHER PUBLICATIONS

Brochure: Technik, "Absolute Position Measurement Using Conducive Plastic Potentiometers".
Brochure: Penny + Giles "Technology Leaders in Displacement Monitoring & Manual Control".
Brochure: DC Hydrostar, "Position Transducer".
"An LVDT Primer", *Sensors*, Jun. 1996, pp. 27–30.
"Understanding Magnetostrictive LDTs", W.D. Peterson, *Hydraulics & Pneumatics*, Feb. 1993, pp. 32–34.
Brochure: Penny + Giles Product Data, "Cylinder Tranducer Model HLP100".
Magazine: "Not Just a Blip on the Screen", *Business Week*, Feb. 19, 1996, pp. 64–65.
"A Physician's Desk Reference", *American Institute of Physics*, New York, 1992, p. 201.
"Handbook of Chemistry and Physics", *CRC Press*, Ohio, 1975, p. E–223.
"The Electrical Engineering Handbook", by R.C. Dorf, *CRC Press*, 1997, pp. 811–812.

*Primary Examiner*—Thomas E. Lazo
(74) *Attorney, Agent, or Firm*—Westman, Champlin & Kelly, P.A.

(57) ABSTRACT

A piston position in a cylinder of a hydraulic assembly is measured using microwave pulses. The microwave pulses are launched along a conductor coupled to the piston or cylinder. A sliding member is slidably coupled to the conductor and moves with the piston or cylinder. Position is determined as a function of a reflection from the end of the conductor and the sliding member. Various aspects include signal processing, fudicial pulse identification control and input/output circuitry, and a three conductor configuration.

46 Claims, 6 Drawing Sheets

U.S. PATENT DOCUMENTS

| | | | |
|---|---|---|---|
| 4,348,855 A | 9/1982 | DePauw et al. | 56/10.2 |
| 4,471,668 A | 9/1984 | Elsner | 74/687 |
| 4,487,002 A | 12/1984 | Kruse et al. | 56/10.2 |
| 4,520,660 A | 6/1985 | Hitchcock | 73/120 |
| 4,543,649 A | 9/1985 | Head et al. | 367/96 |
| 4,584,472 A | 4/1986 | Wiblin et al. | 250/237 |
| 4,588,953 A | 5/1986 | Krage | 324/58.5 |
| 4,631,478 A | 12/1986 | Knetsch et al. | 324/207 |
| 4,689,553 A | 8/1987 | Haddox | 324/58.5 C |
| 4,694,648 A | 9/1987 | Beck, Jr. | 60/452 |
| 4,737,705 A | 4/1988 | Bitar et al. | 324/58.5 C |
| 4,742,794 A | 5/1988 | Hagstrom | 114/286 |
| 4,749,936 A | 6/1988 | Taplin | 324/58.5 B |
| 4,757,745 A | 7/1988 | Taplin | 91/361 |
| 4,774,465 A | 9/1988 | Nilius | 324/208 |
| 4,866,269 A | 9/1989 | Wlodarczyk et al. | 250/231 |
| 4,901,628 A | 2/1990 | Krage | 92/5 |
| 4,913,004 A | 4/1990 | Panoushek et al. | 74/861 |
| 4,938,054 A | 7/1990 | Dye et al. | 73/3 |
| 4,961,055 A | 10/1990 | Habib et al. | 324/662 |
| 4,987,823 A | 1/1991 | Taplin et al. | 91/361 |
| 5,000,650 A | 3/1991 | Brewer et al. | 414/699 |
| 5,072,198 A | 12/1991 | Taplin et al. | 333/33 |
| 5,104,144 A | 4/1992 | Bethell | 280/707 |
| 5,150,049 A | 9/1992 | Schuetz | 324/207 |
| 5,150,060 A | 9/1992 | Bitar | 324/635 |
| 5,182,979 A | 2/1993 | Morgan | 92/5 R |
| 5,182,980 A | 2/1993 | Greer | 92/5 |
| 5,233,293 A | 8/1993 | Huang et al. | 324/207 |
| 5,241,278 A | 8/1993 | Bitar | 324/635 |
| 5,247,172 A | 9/1993 | Riemer | 250/227.21 |
| 5,260,665 A | 11/1993 | Goldberg et al. | 324/636 |
| 5,274,271 A | 12/1993 | McEwan | 307/108 |
| 5,313,871 A | 5/1994 | Kaneko et al. | 91/361 |
| 5,325,063 A | 6/1994 | Morgan | 324/636 |
| 5,332,938 A | 7/1994 | McEwan | 307/572 |
| 5,345,471 A | 9/1994 | McEwan | 375/1 |
| 5,361,070 A | 11/1994 | McEwan | 342/21 |
| 5,365,795 A | 11/1994 | Brower, Jr. | 73/861.65 |
| 5,421,416 A | 6/1995 | Orbach et al. | 172/4 |
| 5,422,607 A | 6/1995 | McEwan | 333/20 |
| 5,424,941 A | 6/1995 | Bolt et al. | 364/148 |
| 5,438,261 A | 8/1995 | Codina et al. | 324/207.16 |
| 5,438,274 A | 8/1995 | Bitar et al. | 324/636 |
| 5,455,769 A | 10/1995 | Panoushek et al. | 364/424.07 |
| 5,457,394 A | 10/1995 | McEwan | 324/642 |
| 5,457,960 A | 10/1995 | Morishita | 91/361 |
| 5,461,368 A | 10/1995 | Comer | 340/607 |
| 5,465,094 A | 11/1995 | McEwan | 342/28 |
| 5,469,749 A | 11/1995 | Shimada et al. | 73/861.47 |
| 5,471,147 A | 11/1995 | Allen et al. | 324/635 |
| 5,471,162 A | 11/1995 | McEwan | 327/92 |
| 5,479,120 A | 12/1995 | McEwan | 327/91 |
| 5,491,422 A | 2/1996 | Bitar et al. | 324/636 |
| 5,494,142 A | 2/1996 | Kale | 192/12 |
| 5,505,267 A | 4/1996 | Orbach et al. | 172/3 |
| 5,510,800 A | 4/1996 | McEwan | 342/387 |
| 5,512,834 A | 4/1996 | McEwan | 324/642 |
| 5,517,198 A | 5/1996 | McEwan | 342/89 |
| 5,519,342 A | 5/1996 | McEwan | 327/94 |
| 5,519,400 A | 5/1996 | McEwan | 342/28 |
| 5,521,600 A | 5/1996 | McEwan | 342/27 |
| 5,523,760 A | 6/1996 | McEwan | 342/89 |
| 5,535,587 A | 7/1996 | Tanaka et al. | 60/427 |
| 5,536,536 A | 7/1996 | Kelley | 427/386 |
| 5,540,137 A | 7/1996 | Lark et al. | 92/5 R |
| 5,549,185 A | 8/1996 | Kale | 192/12 |
| 5,563,605 A | 10/1996 | McEwan | 342/202 |
| 5,573,012 A | 11/1996 | McEwan | 128/782 |
| 5,576,498 A | 11/1996 | Shambayati | 73/861.52 |
| 5,576,627 A | 11/1996 | McEwan | 324/639 |
| 5,581,256 A | 12/1996 | McEwan | 342/37 |
| 5,587,536 A | 12/1996 | Rasmussen | 73/744 |
| 5,589,838 A | 12/1996 | McEwan | 342/387 |
| 5,602,372 A | 2/1997 | Strelow | 200/81.9 R |
| 5,609,059 A | 3/1997 | McEwan | 73/290 R |
| 5,617,034 A | 4/1997 | Lark et al. | 324/635 |
| 5,661,277 A | 8/1997 | Graham, II | 200/81.9 R |
| 5,661,490 A | 8/1997 | McEwan | 342/387 |
| 5,667,452 A | 9/1997 | Coutant | 475/81 |
| 5,710,514 A | 1/1998 | Crayton et al. | 324/635 |
| 5,901,633 A | 5/1999 | Chan et al. | 92/5 R |
| 5,977,778 A | 11/1999 | Chan et al. | 324/635 |
| 6,142,059 A | 11/2000 | Chan et al. | 92/5 R |
| 6,267,042 B1 | 7/2001 | Nagai | 92/5 |
| 6,295,019 B1 | 9/2001 | Richards et al. | 342/125 |
| 6,296,081 B1 | 10/2001 | Nagai et al. | 187/394 |
| 6,297,773 B1 | 10/2001 | Fullerton et al. | 342/457 |
| 6,300,903 B1 | 10/2001 | Richards et al. | 342/450 |
| 6,318,524 B1 | 11/2001 | Lutz et al. | 188/284 |
| 6,357,993 B1 | 3/2002 | Burton | 414/724 |
| 6,359,445 B1 | 3/2002 | Pfizenmaier et al. | 324/636 |
| 6,397,745 B2 | 6/2002 | Koehler | 101/366 |
| 6,401,612 B2 | 6/2002 | Koehler | 101/365 |
| 6,484,620 B2 | 11/2002 | Arshad et al. | 92/5 |
| 6,509,733 B2 | 1/2003 | Blubaugh et al. | 324/207.13 |
| 6,588,313 B2 * | 7/2003 | Brown et al. | 92/5 R |

* cited by examiner

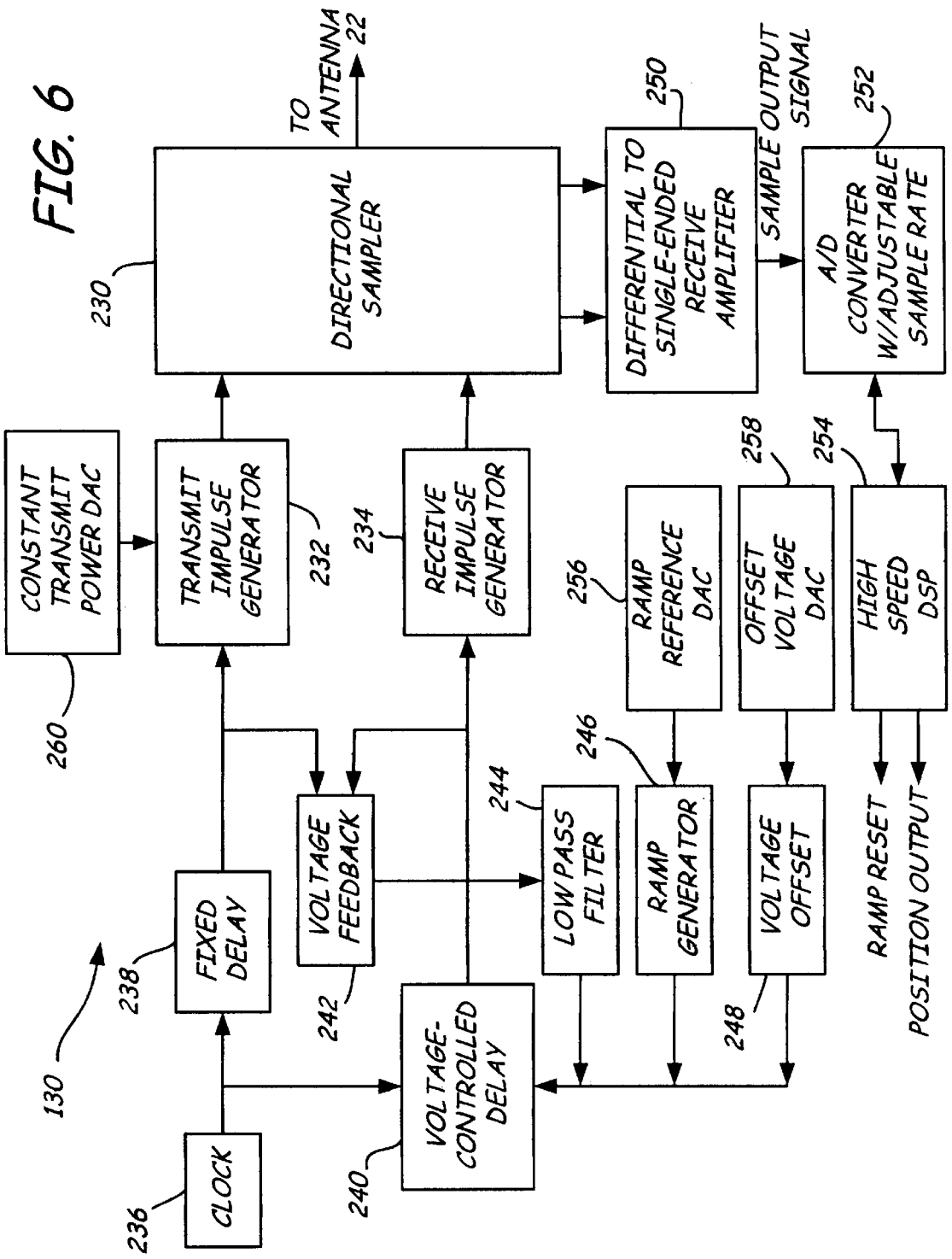

US 6,722,261 B1

HYDRAULIC PISTON POSITION SENSOR SIGNAL PROCESSING

REFERENCE TO CO-PENDING APPLICATION

Applicant hereby references co-pending patent application U.S. Ser. No. 09/991,817, filed Nov. 19, 2001, entitled HYDRAULIC PISTON POSITION SENSOR, commonly assigned with the present application.

BACKGROUND OF THE INVENTION

The present invention relates to hydraulic pistons. More specifically, the present invention relates to position sensors used to sense the relative position between a piston and a hydraulic cylinder.

Hydraulic cylinders are used in a wide variety of applications, such as heavy equipment, to move large loads. Traditionally, the control of the hydraulic cylinder has been through an operator who visually observes the extension and position of the hydraulic cylinder and operates the control mechanisms accordingly. However, this technique is inaccurate and can lead to damage of the hydraulic equipment and the work piece being manipulated. Further, this technique cannot be used in situations in which the operator can not see the cylinder. In order to address these shortcomings, displacement sensors have been used to measure the position of a piston in a hydraulic cylinder.

Various types of displacement sensors are used to measure the relative position of the piston in the hydraulic cylinder. However, devices to remotely measure absolute displacement in harsh environments with a high degree of reliability are presently complex and costly. Examples of presently used technologies are Magnitostrictive devices that use time of flight of a mechanical signal along a pair of fine wires encased in a sealed metal tube, which is reflected back from a magnitostrictively induced change in the rod's mechanical properties.

Another technology uses an absolute rotary encoder, which is a device that senses rotation. The translational to rotary conversion is typically done with gears, or a cable or tape that is uncoiled from a spring loaded drum. Absolute encoders tend to suffer from limited range and/or resolution.

Harsh environments that include high levels of vibration tend to exclude absolute etched glass scales from consideration due to their critical alignment requirements, their susceptibility to brittle fracture and intolerance to fogging and dirt. This technology also needs to re-zeroed frequently.

Inferred displacement measurements such as calculating the translation of a cylinder by integrating a volumetric flow rate into the cylinder over time suffer from several difficulties. First, these devices are incremental and require frequent, manual re-zeroing. Secondly, they tend to be sensitive to environmental effects, such as temperature and density. They require measuring these variables to provide an accurate displacement measurement, Finally, integrating a flow measurement to determine displacement tends to decrease the accuracy of measurement. This technology also is limited by the dynamic sensing range of the flow measurement. Flows above and below this range have very high errors.

One technique used to measure piston position uses electromagnetic bursts and is described in U.S. Pat. Nos. 5,977,778, 6,142,059 and WO 98/23867. However, this technique is prone to emitting radiation into the environment or is difficult to calibrate.

SUMMARY OF THE INVENTION

A device to measure relative position of a hydraulic piston in a cylinder includes a rod extending along the direction of movement of the piston which is fixedly coupled to one of the piston or cylinder. The rod is configured to carry a microwave (including ultra wideband RF and radar) pulse. A sliding member is slidably coupled to the rod and fixedly coupled to the other of one of the piston or cylinder. The sliding member is configured to cause a partial reflection of the microwave pulse. The end of the rod also provides a reflection. Piston position is calculated as a function of reflected microwave pulses from the sliding member and the rod end.

BRIEF DESCRIPTION OF THE DRAWINGS

FIG. 6 is a block diagram showing a microwave transceiver.

DETAILED DESCRIPTION OF THE PREFERRED EMBODIMENTS

The present invention provides a technique for measuring the position of a piston relative to a cylinder of a hydraulic cylinder assembly. With the present invention, a microwave signal is used to measure the relative position of the piston in the cylinder. When such a technique is used to measure piston position, it is sometimes difficult to get an accurate position measurement because of noise and other problems associated with accurately obtaining such a measurement.

Figure 1:
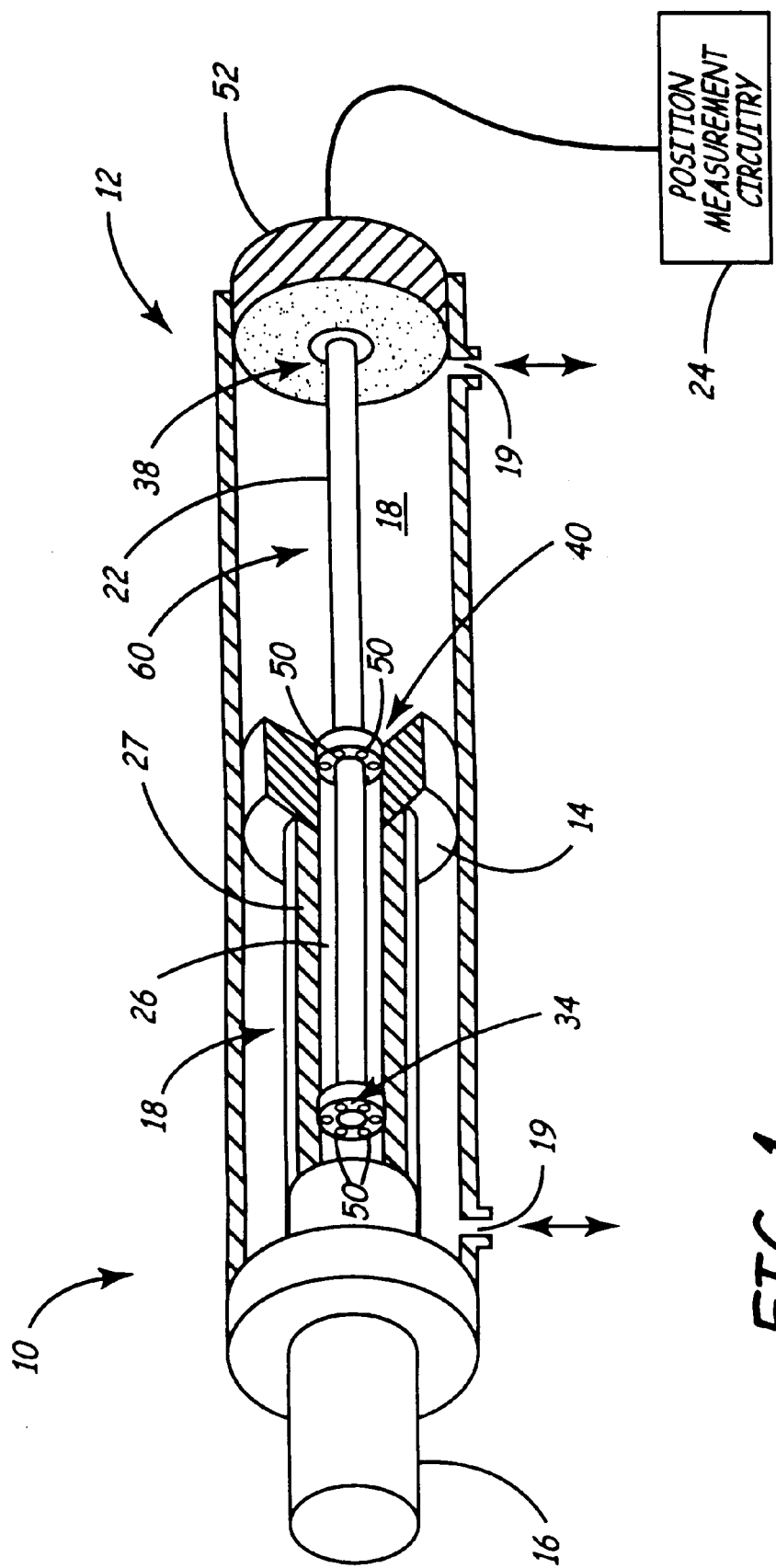
FIG. 1 is a side cutaway view of a hydraulic assembly including position measurement circuitry.

FIG. 1 is a perspective cross-sectional view of a hydraulic piston/cylinder assembly 10 in accordance with one embodiment of the invention. Assembly 10 includes cylinder 12 which slidably carries piston head 14 therein. Piston 14 is coupled to piston rod 16. Piston head 14 moves within cylinder 12 in response to hydraulic fluid 18 being applied to or withdrawn from the interior of cylinder 12 through an orifice 19. A seal extends around piston head 14 to prevent leakage of hydraulic fluid therepast.

An antenna rod 22 extends in the direction of cylinder 12 and is coupled to position measurement circuitry 24. A bore 26 extends through piston rod 16 and piston head 14 and receives antenna rod 22. Rod guides 34 and 40 couple to piston rod 16 and piston head 14, respectively and slide along antenna rod 22. Guides 34,40 reflect microwave pulses transmitted along antenna rod 22 as discussed below. Passageways 50 allow fluid 18 to pass through guides 34, 40. In this embodiment, guide 34 is fixedly coupled to antenna rod 22 and slides within bore 26 of piston rod 27 and guide 40 is fixedly coupled to piston head 14 and slides along antenna rod 22. Position measurement circuitry 24 couples to antenna rod 22 through feedthrough connection 38. The feedthrough connection preferably includes cup 38 which extends from a base 52 cylinder 12 and couples rod 22 to position measurement circuitry 24.

In operation, piston 14 slides within cylinder 12 as hydraulic fluid 18 is injected into or removed from cylinder 12. Piston 14 also slides along antenna rod 22 which is received in bore 26 of piston 14. Contacting guide or bushing 40 rides along antenna rod 22 as piston 14 moves within cylinder 12. Although the antenna rod 22 is shown fixed to cylinder 12, it can also be fixed to piston 14 and move relative to cylinder 12.

Position measurement circuitry 24 provides a position output based upon reflections from microwave signals which are coupled to antenna rod 22. The microwave signal is reflected at three locations on antenna rod 22: at base 38 (fudicial pulse), at contacting guide or bushing 40 and at the rod end at guide or bushing 34. Position measurement circuitry is responsive to a ratio of the time delay between the reflected signal from the fudicial and the piston face, and the fudicial and the end of the antenna rod to determine the relative position of piston 14 in cylinder 12.

In a preferred embodiment, the present invention utilizes Time Domain Reflectometry (TDR). TDR technology is a time of flight measurement technology. A well-defined impulse or pulsed microwave radar signal is coupled into suitable medium. The radar signal is coupled into transmission lines made in the shape of dual parallel (or coaxial) conductors. This dual parallel conductor geometry is preferable because it limits radiated electromagnetic interference (EMI). The device responsible for the generation of the radar signal, the coupling of the radar signal into the transmission line, and the sensing of the reflected signal is referred to herein as the transducer.

The basic TDR measurement is achieved by sending a radar pulse down a long, slender transmission line, such as antenna rod 22 in FIG. 1 and measuring to a high degree of accuracy the time required for the signal to travel down to a point of reflection and back again. This point of reflection can be from the distal end of the antenna rod 22 and may be through a mechanical body such as guide 34. If a mechanical body (sliding member 40) is made to move along the length of the transmission line, its position can be determined from the transit time of its reflected pulse. Specifically, a radar pulse that is sent to the end of the transmission line formed by antenna rod 22 at guide 34 is generated and timed. This is then compared to the pulse transit time reflected by the sliding mechanical body 40. One advantage of this technique is that the measurement is independent of the medium surrounding the transmission line. Various aspects of this measuring technique are shown and described in U.S. patent application Ser. No. 09/991,817, filed Nov. 19, 2001.

One advantage of this measurement technique is that the frequency of measurement occurs sufficiently rapidly to differentiate the position measurements in time to thereby obtain velocity and acceleration of the piston, if desired. In addition, by suitably arranging the geometry of the transmission lines, angular displacement can also be measured.

Cup 38 can be configured to produce a "fudicial" pulse by partially reflecting the microwave signal. The fudicial pulse can be used by position measurement circuitry 24 to initiate signal processing and provides a reference pulse which identifies the position of the base 52 of cylinder 12. Position measurement circuitry 24 does not need to process the signal prior to receiving this fudicial pulse.

One problem when using a reflected microwave pulse to determine position is that it is inaccurate when the piston head 14 is in the fully retracted position. This is due to the impedance mismatch at the piston head tending to disappear as the piston face nears the cylinder base 52. As the piston face approaches the base 52, the large impedance (130 ohms for example) begins to decrease because the piston face is ground. In the fully retracted position, the cylinder barrel impedance is greatly influenced by the piston and is relatively low (for example less than 20 ohms). In this condition, the fudicial reflection and piston face reflection are both relatively small and substantially merged together into a single reflected pulse. This makes measurements near the fully closed position difficult and inaccurate. This merging of pulses also occurs when the piston face is near the distal end of antenna rod 22. This can be addressed by lengthening the rod.

When the piston 14 is in a fully extended position, interference from the end of rod 22 can cause an interference with the pulse reflected from the piston face. The reflection appears as a spread out double pulse. In one aspect, signal processing is used to identify the true piston position. For example, curve fittings can be to fit the reflection to a parabola. The actual piston position is then matched to the fitted parabola.

Figure 2:
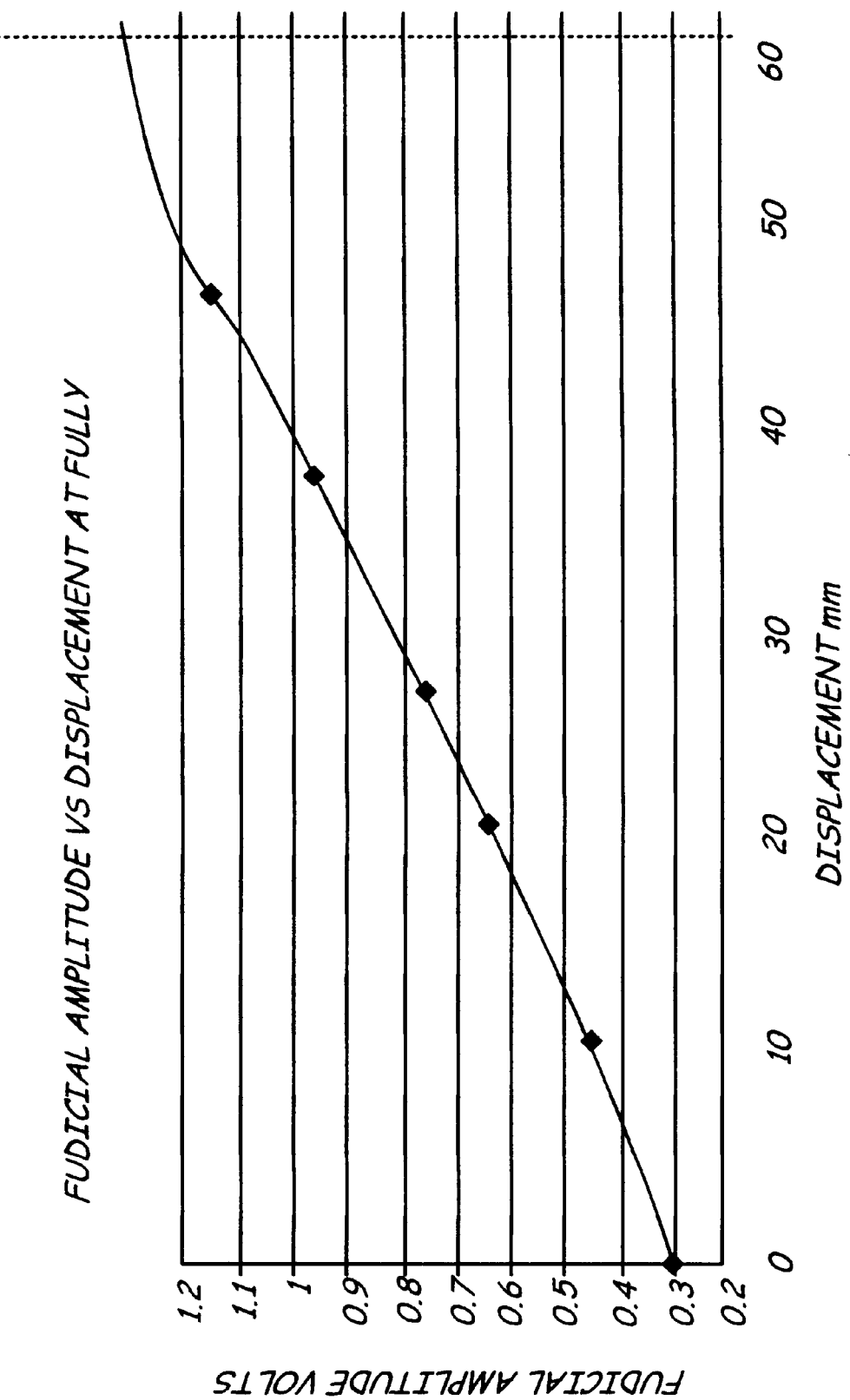
FIG. 2 is a graph of fudicial amplitude versus displacement.

In one aspect, the present invention uses an alternative position measurement technique when the piston 14 nears the fully retracted position near base 52. FIG. 2 is a graph of a fudicial amplitude in volts versus piston displacement in millimeters. As illustrated in FIG. 2, the amplitude of the fudicial pulse generated near cup 38 in FIG. 1 is related to piston displacement. This change in fudicial amplitude occurs because the ground plane of the piston face interacts with the fudicial impedance mismatch. The amplitude of the fudicial pulse decreases substantially monotonically to a minimum value at a fully retracted position. The fudicial pulse amplitude begins to decrease at about one half of the wavelength of the microwave pulse. The piston position measurement circuitry 24 can use measurement of fudicial amplitude to determine piston position when the piston nears the fully retracted position. In some embodiments, measurement circuitry 24 can use both fudicial amplitude and the time of flight data to determine piston position. This measurement can be significant in applications that control piston position near the fully retracted position. It is often desirable to reduce the speed of piston displacement as the piston nears the end of its stroke and approaches the mechanical stop. This can reduce the wear placed on the mechanical stop. Piston position can be determined as a function of the fudicial amplitude using a look-up table, a polynomial equation, or other technique.

Figure 3:
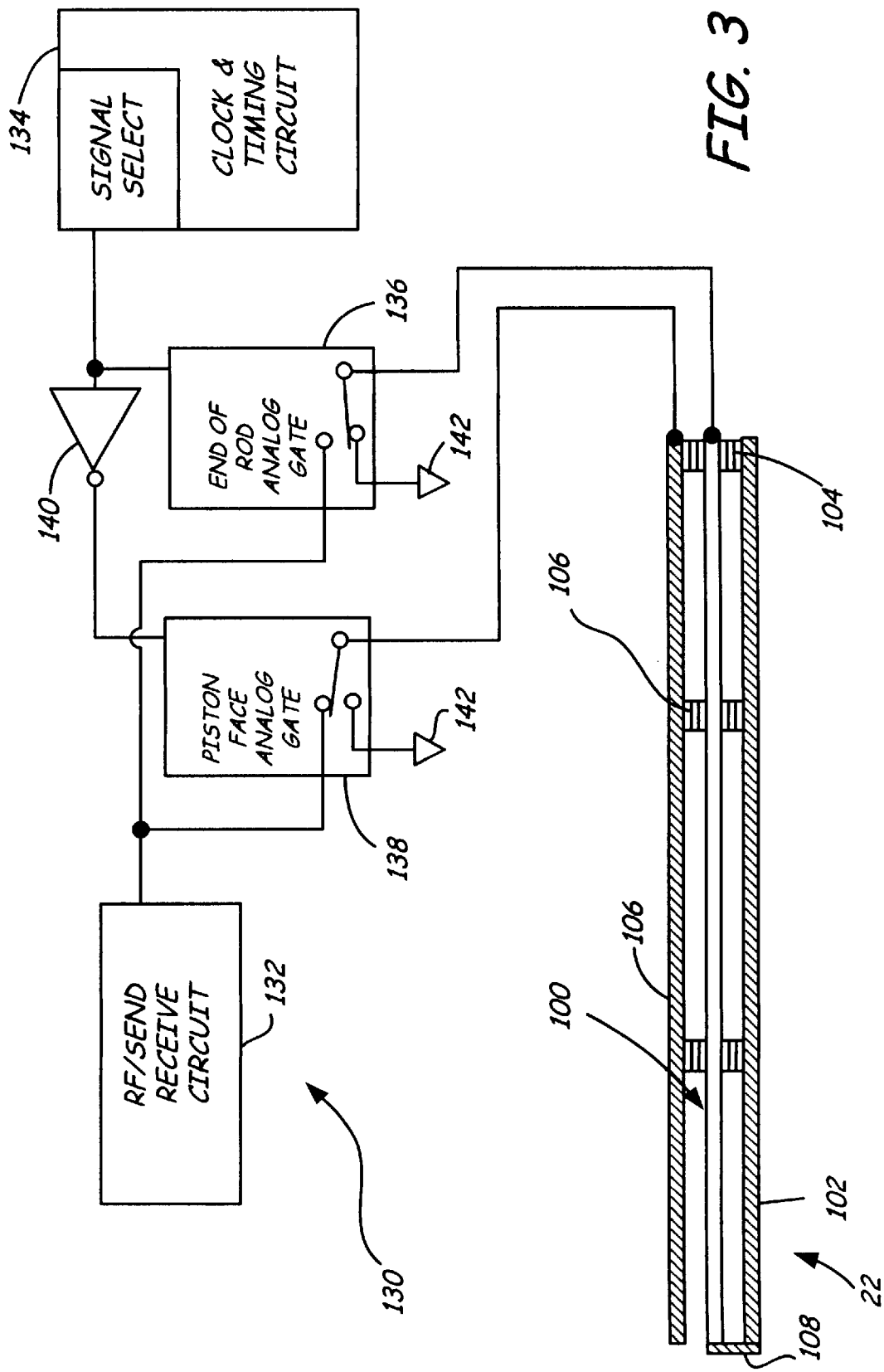
FIG. 3 is a simplified block diagram showing a three conductor configuration and associated electronics circuitry for use with an antenna rod of the present invention.

FIG. 3 shows another aspect of the present invention and includes a cross-sectional view of antenna rod 22 coupled to a block diagram of microwave transceiver circuitry 130. This aspect of the invention includes the use of a three element transmission line system for obtaining position measurements. As illustrated in FIG. 3, in this embodiment antenna rod 22 includes a center reference conductor 100 which extends along the interior of a hollow, cylindrical outer sense conductor 102. Center conductor 100 is held in conductor 102 on one end by a solid insulator 104. Any number of supports 106 support conductor 100 along its length. Supports 106 have openings which extend therethrough to allow the hollow sense conductor 102 to be filled with hydraulic fluid 18. At a distal end of antenna rod 22, a conductive or non-conductive (insulating support) support 108 secures conductor 100 to conductor 102.

With this aspect of the invention, the reference conductor 100 can be used to generate reference pulses. The exterior sense conductor 102 interacts with piston 14 to generate pulses indicative of piston position. This configuration provides a number of benefits. The conductor configuration reduces extraneous radiation which reduces interference with other electrical equipment and can help meet various regulatory requirements can be a requirement to various regulations. In some embodiments, the third transmission line can comprise the housing of the cylinder. This provides an electrical ground with respect to the sensing rod elements to protect them from spurious changes in dielectric external to the cylinder, for example due to a coating of mud or debris. The reference conductor 100 provides an independent reflection path for sensing the apparent position of the antenna rod 22. The reference conductor 100 eliminates spurious primary and secondary reflections from the piston face that may distort the reflection from the end of the rod. With this embodiment, the position of the piston face is measured using a microwave pulse sent along the sense conductor 102. The reference pulse which is used to determine the position of the end of the antenna rod 22 is sent along the reference conductor 100.

In FIG. 3, microwave transceiver circuit 130 is configured to alternately send and receive pulses along center reference conductor 100 or sense conductor 102. Circuitry 130 includes an RF send/receive circuit 132 and a clock and timing circuit 134. An end of rod analog gate 136 couples to RF send/receive circuit 132 and center reference conductor 100. A piston face analog gate 138 couples to RF send/receive circuit 132 and sense conductor 102. In operation, clock and timing circuit 134 provides a signal select output to gate 136 and, through an inverter 140, to gate 138. Gates 136 and 138 are alternately energized to selectively couple RF send/receive circuit to either center reference conductor 100 or outer sense conductor 102. The gates 136 and 138 are configured to alternately couple the reference conductor 100 or the sense conductor 102 to RF ground 142 or to RF send/receive circuit 132. Using this configuration, a single RF send/receive circuit 132 can be used to obtain measurements from either reference conductor 100 or sense conductor 102 as desired. Although the configuration shown uses the cylinder 12 as a third conductor, in another embodiment a separate third conductor surrounds the sense conductor 102 to provide a ground. Further, different conductor shapes and configurations can be used as desired.

Figure 4:
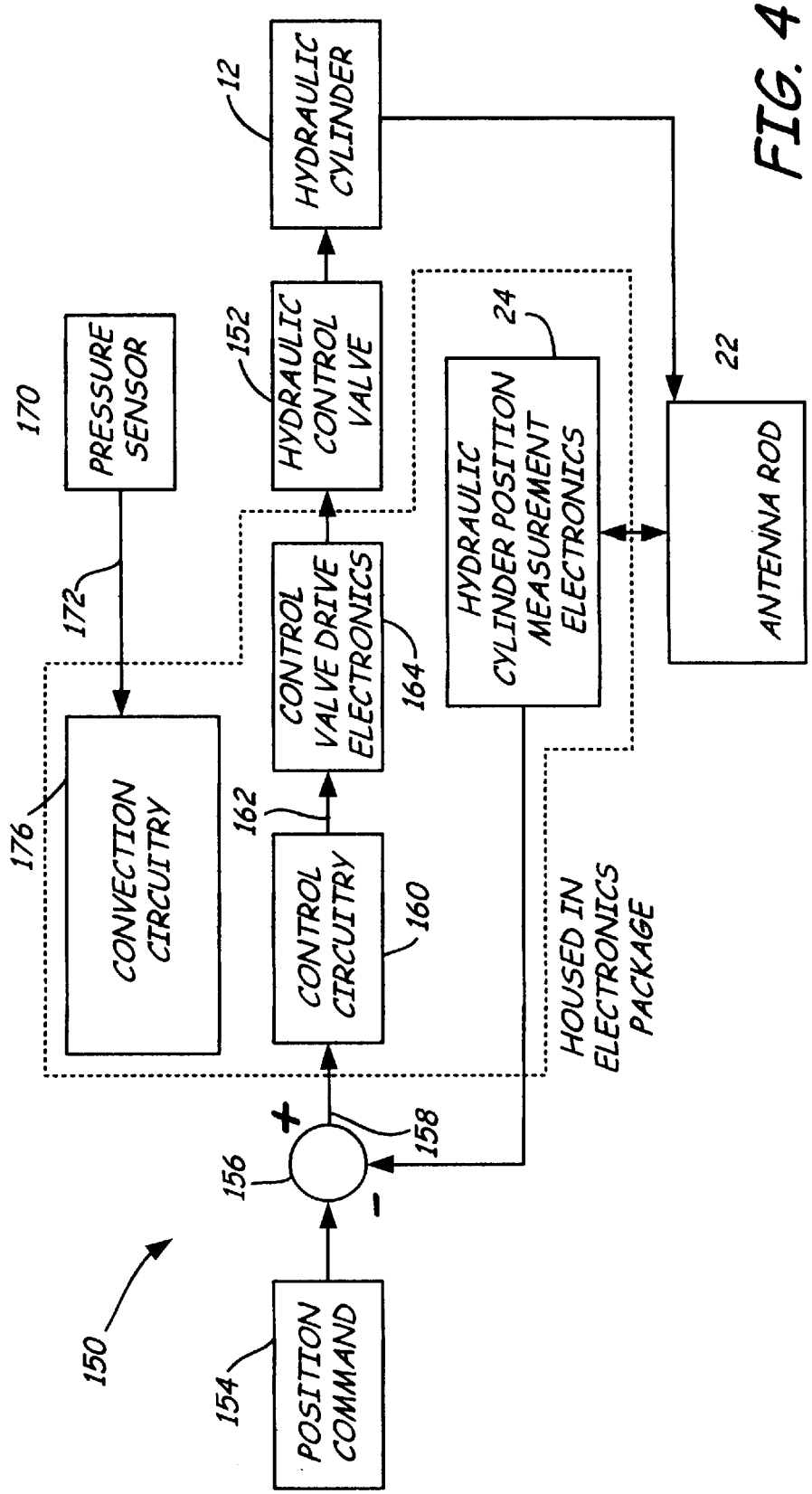
FIG. 4 is a simplified block diagram showing control circuitry which uses position feedback.

Using the piston position measurement techniques of the present invention, a control system 150 can be implemented such as that illustrated in the example of FIG. 4. The control system 150 can implement any control technique such as those which use integrals or derivatives in their calculations. Example control functions include proportional (P), integral (I), or derivative (D), and any of their combinations. In FIG. 4, control system 150 couples to hydraulic cylinder 12. The position of the piston head 14 (not shown in FIG. 4) within cylinder 12 is controlled by controlling hydraulic control valve 152 to supply or withdraw hydraulic fluid in cylinder 12. The position of the piston within the hydraulic cylinder 12 is determined using antenna rod 22 and hydraulic piston position measurement circuitry 24 in accordance with the invention. A desired position command 154 is received at summation node 156. At node 156, the actual position measured by measurement circuitry 24 is subtracted from the desired position command 154 and the output is provided to control circuitry 160. Control circuitry 160 can be implemented in analog, digital or hybrid techniques and provides any desired control function. In one embodiment, the control function is a function of either the integral or derivative of the difference value 158 provided by summation node 156. The control output 162 from control circuitry 160 is a function of the different signal 158 and at least one previous value of the control output 162. Control signal 162 is provided to control valve drive electronics 162 which drives the hydraulic control valve 152 to thereby position the piston head 14 within hydraulic cylinder 12 as desired.

In some embodiments, the load applied to the hydraulic cylinder will vary greatly during operation. Such variations in load can cause inaccuracies in the piston positioning provided using control circuitry 160. Large loads can cause over shoot in positioning because the large mass or pressures involved will cause the piston to move beyond the desired set point. One technique which can be used to compensate for such loads uses a pressure sensor 170 which is configured to sense the pressure of the hydraulic fluid applied to the hydraulic cylinder 12. A sensed pressure output 172 is provided to conversion circuitry 176. Conversion circuitry 176 provides a conversion of the sensed pressure 172 to a value which is representative of the load applied to the hydraulic cylinder 12. Control circuitry 160 can be configured such that the control signal 162 is a function of the load applied to hydraulic cylinder 12 is sensed to the converted pressure signal. Additionally, the control signal can be a function of piston velocity. Further, the control function can be configured to provide "cushioning". "Cushioning" refers to a velocity reduction as the piston approaches the fully extended or fully retracted positions. The cushioning can reduce the damage caused by the piston hitting its mechanical stops.

The various constants in the control function can be tuned or adjusted as desired or based upon various load conditions or cushioning parameters. By estimating the load on the hydraulic cylinder, safety information such as overload conditions can be conveyed to an operator. The control circuitry can be configured to hold a position of the piston at a current location or move the piston to a safe position upon the occurrence of an alarm condition. The circuitry can be configured integrally with a control valve 152 or hydraulic cylinder 12 or located remotely.

Figure 5:
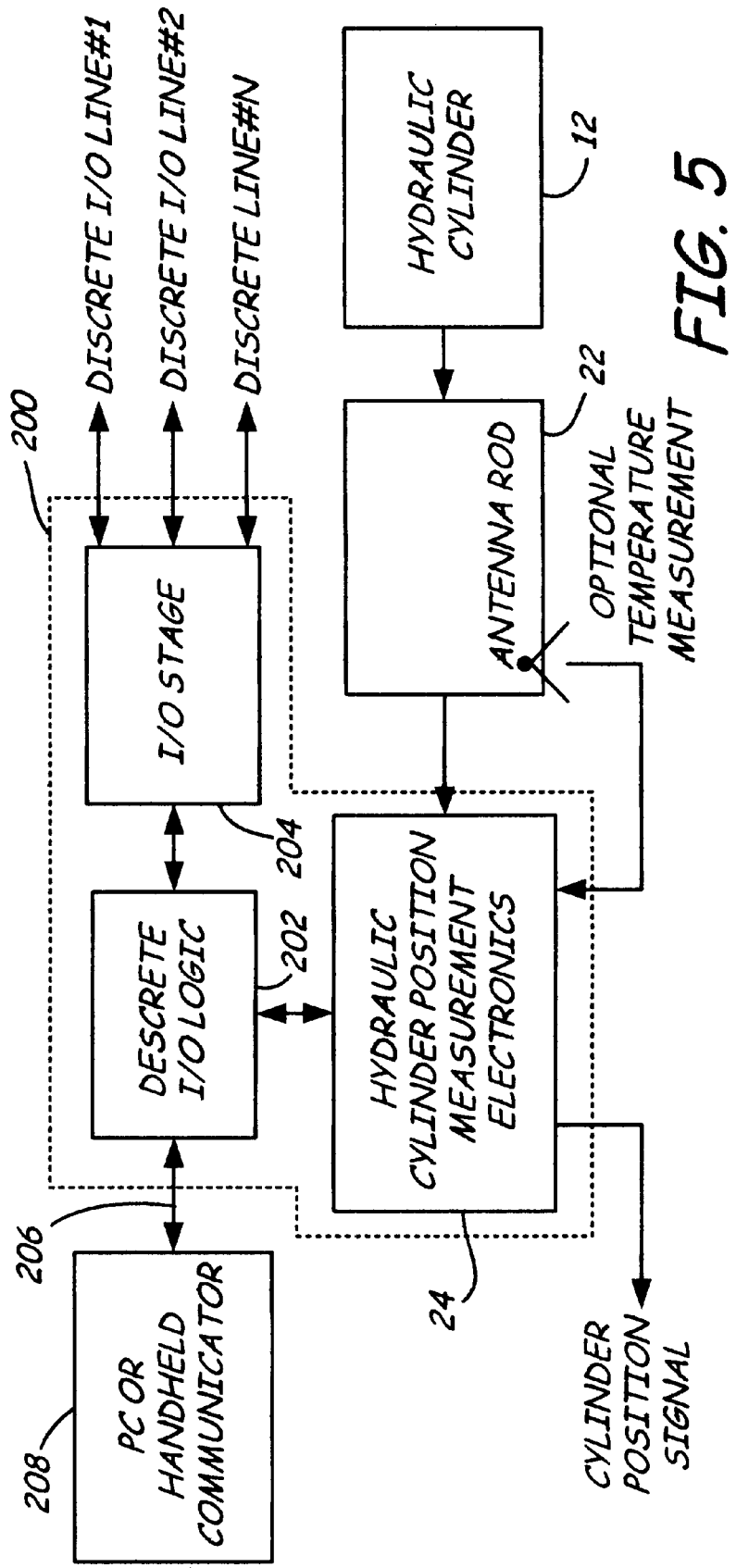
FIG. 5 is a simplified block diagram of input/output circuitry for use with piston position measurement circuitry.

FIG. 5 is a block diagram showing input/output circuitry for use with hydraulic piston position measurement circuitry 24. As illustrated in FIG. 5, in accordance with this aspect of the invention, a system 200 includes discrete input/output logic 202 coupled to piston position measurement electronics 24. Discrete I/O logic 202 couples to an output stage 204 which has any number of input/output connections (lines). These connections can provide contact closures in response to specified events or output or receive data. A data bus connection 206 is also provided to I/O logic 202 which can be used for coupling to a computer system 208 such as a PC or hand-held communicator.

The discrete input/output lines can be used for backwards compatibility to existing systems by providing outputs which simulate limit switches. The outputs can provide a change in a voltage level or a current level, or provide a switch closure in response to the piston position or piston velocity reaching a threshold. Similar outputs can be provided if the cylinder reaches a predetermined temperature or fails a self diagnostic.

The function of the various input/output lines can be programmed as desired. For example, one input/output line can be configured to provide an output when the piston reaches a particular position, or reconfigured to provide an output related to piston velocity. In another example, the threshold set point for a limit switch configuration can be adjusted. For example, an input line can be set to a voltage that corresponds to a position at which a limit switch should change states. If the voltage applied to the input line is changed, the limit switch trigger threshold level would change to a new position or velocity represented by the new voltage. The programming and configuration of the output functions can be controlled using an input function through the discrete I/O connections, or through the data bus 206 and programmed using a PC or hand-held communicator. The data bus 206 can be hard wired or use a wireless communication technique as desired.

The discrete I/O lines can also be used to provide alarm functions. Some example alarm conditions that can be reported through the I/O lines include excessive temperature of hydraulic fluid, excessive temperature of electronic circuitry, sub-operating temperature of electronic circuitry, electronic circuitry self test failure, measurement out of range, antenna open circuit, antenna short circuit, maximum velocity exceeded or electronic cushioning failure. When used in conjunction with a controller such as that shown in FIG. 4, the specific control functions and constants can also be adjusted using the input lines. Because the functions of the discrete I/O lines can be programmed as desired, the overall wiring required to couple to the piston position measurement electronics 24 is reduced. Further, using the piston position measurement electronics 24 to provide limit switch functionality provides increased durability over traditional limit switches which can jam or break with use, or become covered with debris.

The discrete I/O logic 202 is used to control the I/O stage 204 to obtain the desired functionality. The I/O stage 204 can be implemented using analog or digital circuitry, or a hybrid combination. The I/O logic 204 can be implemented in a microprocessor or, if applicable, using less complex logic techniques such as a programmable logic controller (PLC). Data communication can be through any appropriate technique including standards such as HART®, CAN, Fieldbus, or others. The I/O lines can share the same connection used to carry power and/or position signals.

FIG. 6 is a block diagram showing one embodiment of microwave transceiver circuitry 130 in accordance with aspects of the present invention. Circuitry 130 includes a directional sampler 230 which connects to antenna rod 22. Impulse generators 232 and 234 couple to directional samplers and are initiated by a signal from a clock 236. The clock signal is delayed through a fixed delay 238 and applied to impulse generator 232 and through a voltage control delay 240 which is applied to impulse generator 234. The voltage controlled delay 240 provides a delay which is a function of voltage feedback 242 from the fixed delay 238. The output from voltage controlled delay 240 which is applied to a low pass filter 244. The voltage controlled delay 240 is also a function of a ramp from ramp generator 246 and a voltage from voltage offset 248.

The differential output from the directional sampler 230 are supplied to a differential-to-single ended receive amplifier. This provides a sample output signal which contains information related to piston position. The sample output signal is converted by an analog to digital converter 252 with an adjustable sample rate. A digital computation device 254 such as a high speed Digital Signal Processor (DSP) or microprocessor receives the digitized sample output from analog to digital converter 252 and is used to determine piston position. The computation device 254 provides a ramp reset output which resets the ramp generator 246. A position output signal can be provided to, for example, digital to analog converters which can provide an analog representation of piston position.

A ramp reference signal is provided to ramp generator 246 by digital to analog converter 256. An offset voltage signal is provided to voltage offset 248 by digital to analog converter 258.

In an operational example, the microwave transceiver 130 uses a single clock to generate pulsed microwave signals at 2 gigahertz. A ramp generator is used to provide a voltage delay to a receive impulse generator. When a received impulse coincides with the delayed impulse from the receive impulse generator 234, directional sampler 230 provides a single pulse output. This creates an equivalent-time analog waveform. In the present invention, the use of digital signal processing allows the circuit to operate with waveforms in which return pulses are merged with spurious signals. This can occur, for example, when the reflected pulse from the piston is near the reflected pulse from the fudicial. A positive going pulse merged with a negative going pulse will appear as a small pulse as the two pulses will tend to cancel. Two positive or two negative going pulses will merge and "smear" such that it is difficult to determine the exact pulse location. The pulse position can be determined using digital signal processing techniques including threshold or slope detection, curve fitting algorithms, Fourier analyses or others.

With the computation device 254, the sample rate of analog to digital converter 252 can be configured such that the scan range approximates the length of the cylinder. Further, the number of samples in a particular portion of the waveform which is of interest can be increased to improve accuracy. Computation device 254 is also well suited for use when the piston 14 is rapidly moving because the computation device 254 can help to reduce latency errors. The computation device 254 can operate at a clock rate of 200 MHz or more. This provides more updates with reduced latency. The update rate can also be increased by controlling operation of the ramp generator using digital to analog converters 256 and 258. The offset voltage can be adjusted using digital to analog converter 258 such that the microwave transceiver circuitry 130 can be separated from the antenna 22 and positioned at a remote location, away from the hostile environment in which a hydraulic cylinder may operate. By adjusting the offset voltage, the electronics can be adjusted to ignore the distance added by the cable run. The offset can be adjusted as desired for a particular installation. The height of the ramp signal can be controlled using the ramp reference digital to analog converter 256. This allows the update rate to be increased by optimizing ramp height for a particular scan range. A digital to analog converter 260 can be used to provide a constant transmit power. For example, as components age or due to temperature effects, the amplitude of the transmit pulse can fluctuate. Small changes in the transmit power will increase the error in the electronic processing. The digital to analog converter 260 can power an operational amplifier which controls a transmit transistor to maintain a constant transmit power. The digital to analog converters 256, 258 and 260 are controlled by the computation device 254 or other logic. The adjustment and setting of these values can be done during manufacture, during installation or during use of the system. Values can be set using internal software, or programmed through a user or other interface.

Although the present invention has been described with reference to preferred embodiments, workers skilled in the art will recognize that changes may be made in form and detail without departing from the spirit and scope of the invention. Various other example embodiments are shown in co-pending application U.S. Ser. No. 10/316,478, filed Dec. 11, 2002, and U.S. patent application Ser. No. 09/991,817, filed Nov. 19, 2001, entitled HYDRAULIC PISTON POSITION SENSOR which are incorporated herein in their entirety. As used herein, microwave includes ultra wideband radio frequency (RF) and radar.

What is claimed is:

1. An apparatus for measuring relative position of a hydraulic piston in a cylinder, comprising:
   an antenna rod extending in a direction of movement of the piston fixedly coupled to the cylinder, the rod configured to carry a microwave pulse between a coupling and a distal end of the rod;
   a sliding member slidably coupled to the piston, the sliding member configured to cause a partial reflection of the microwave pulse;
   a fudicial member coupled to a proximal end of the antenna rod and configured to generate a fudicial reference reflection in response to a microwave pulse;

microwave transceiver circuitry coupled to the antenna rod configured to generate and receive microwave pulses; and computation circuitry configured to calculate piston position;

wherein an amplitude of a fudicial reference reflection is related to piston position when the piston is proximate the fudicial member and the computation circuitry calculates piston position based upon the amplitude of the fudicial reference pulse when the piston is proximate the fudicial member.

2. The apparatus of claim 1 wherein the antenna rod includes a reference conductor surrounded by an outer conductor.

3. The apparatus of claim 1 including a controller configured to provide a control signal to a hydraulic actuator as a function of piston position.

4. The apparatus of claim 1 including a programmable discrete input/output line.

5. The apparatus of claim 1 including a digital computation device configured to process a signal which is a function of a reflected microwave pulse and a pulse delayed within the transducer circuitry.

6. The apparatus of claim 1 wherein a relationship between piston position and amplitude of the fudicial reference reflection is substantially monotonic.

7. The apparatus of claim 1 wherein the calculation circuitry calculates piston position using a look-up table.

8. The apparatus of claim 1 wherein the calculation circuitry calculates piston position using a polynomial equation.

9. The apparatus of claim 1 wherein the computation circuitry calculates piston position based upon a time delay of the microwave pulse reflected by the sliding member.

10. An apparatus for measuring relative position of a hydraulic piston in a cylinder, comprising:

an antenna rod extending in a direction of movement of the piston fixedly coupled to the cylinder, the rod configured to carry a microwave pulse between a coupling and a distal end of the rod, the antenna rod comprising a reference conductor at least partially within an outer conductor;

a sliding member slidably coupled to the outer conductor of the antenna rod and slidable as the piston moves within the cylinder to cause a partial reflection of the microwave pulse;

microwave transceiver circuitry coupled to the antenna rod configured to generate and receive microwave pulses; and computation circuitry configured to calculate piston position as a function of reflected microwave pulses carried on the outer conductor and reflected microwave pulses carried on the reference conductor of the antenna rod.

11. The apparatus of claim 10 wherein the outer conductor has a tubular shape.

12. The apparatus of claim 10 including switching circuitry configured to selectively couple the microwave transceiver to the outer conductor of the antenna rod.

13. The apparatus of claim 10 wherein the reference conductor comprises an elongate conductor extending along an interior of the outer conductor.

14. The apparatus of claim 13 wherein the reference conductor extends along a center of the outer conductor.

15. The apparatus of claim 10 wherein the outer conductor has a tubular shape.

16. The apparatus of claim 10 further comprising a fudicial member coupled to the antenna rod to generate a fudicial reference reflection and wherein piston position is calculated as a function of amplitude of a reflected fudicial reference pulse when the piston is proximate a fudicial member.

17. The apparatus of claim 10 including a controller which provides a control signal to a hydraulic actuator as a function of piston position.

18. The apparatus of claim 10 including a programmable discrete input/output line.

19. The apparatus of claim 10 including a digital computation device configured to process a signal which is a function of a reflected microwave pulse and a delayed microwave pulse.

20. An apparatus for measuring relative position of a hydraulic piston in a cylinder, comprising:

an antenna rod extending in a direction of movement of the piston fixedly coupled to the cylinder, the rod configured to carry a microwave pulse between a coupling and a distal end of the rod;

a sliding member slidably coupled to the piston, the sliding member configured to cause a partial reflection of the microwave pulse;

a fudicial member coupled to a proximal end of the antenna rod configured to generate a fudicial reference reflection in response to a microwave pulse;

microwave transceiver circuitry coupled to the antenna rod configured to generate and receive microwave pulses;

computation circuitry configured to calculate a piston position as a function of the partial reflection of the microwave pulse from the sliding member; and control circuitry configured to provide a control signal to a hydraulic actuator in response to a command input and the piston position, the control signal a function of at least one of an integral or derivative of the piston position.

21. The apparatus of claim 20 including a pressure sensor configured to sense pressure of hydraulic fluid from the hydraulic actuator and wherein the control signal is further a function of the sensed pressure.

22. The apparatus of claim 20 wherein the antenna rod includes a reference conductor in an outer conductor.

23. The apparatus of claim 20 wherein piston position is calculated as a function of amplitude of a microwave pulse reflected from a fudicial member when the piston is proximate the fudicial member.

24. The apparatus of claim 20 including a programmable discrete input/output line.

25. The apparatus of claim 20 including a digital computation device configured to process a signal which is a function of a reflected microwave pulse and a delayed microwave pulse.

26. The apparatus of claim 20 wherein the control circuitry provides cushioning in the control signal as the piston approaches an end of the cylinder.

27. An apparatus for measuring relative position of a hydraulic piston in a cylinder, comprising:

an antenna rod extending in a direction of movement of the piston fixedly coupled to the cylinder, the rod configured to carry a microwave pulse between a coupling and a distal end of the rod;

a sliding member slidably coupled to the piston, the sliding member configured to cause a partial reflection of the microwave pulse;

a fudicial member coupled to a proximal end of the antenna rod configured to generate a fudicial reference reflection in response to a microwave pulse;

microwave transceiver circuitry coupled to the antenna rod configured to generate and receive microwave pulses;

computation circuitry configured to calculate a piston position as a function of the partial reflection of the microwave pulse from the sliding member; and control circuitry including an input/output (I/O) connection having a plurality of programmable functions.

28. The apparatus of claim 27 wherein the input/output connection comprises a switched output.

29. The apparatus of claim 27 wherein the input/output connection comprises a voltage level output.

30. The apparatus of claim 27 wherein the input/output connection comprises a current level output.

31. The apparatus of claim 27 wherein the input/output connection comprises an input for receiving a set point for a limit switch function.

32. The apparatus of claim 27 wherein the input/output connection provides an alarm condition output.

33. The apparatus of claim 32 wherein the alarm condition is selected from the group of conditions consisting of excessive temperature, sub-operating temperature, measurement out of range, self-test failure, antenna open circuit, antenna short circuit, maximum velocity exceeded and electronic cushioning failure.

34. The apparatus of claim 27 including an input for use in programming a function of the input/output connection.

35. The apparatus of claim 27 including a controller configured to provide a control signal to a hydraulic actuator as a function of piston position.

36. The apparatus of claim 27 including a digital computation device configured to process a signal which is a function of a reflected microwave pulse and a delayed microwave pulse.

37. An apparatus for measuring relative position of a hydraulic piston in a cylinder, comprising:

an antenna rod extending in a direction of movement of the piston fixedly coupled to the cylinder, the rod configured to carry a microwave pulse between a coupling and a distal end of the rod;

a sliding member slidably coupled to the piston, the sliding member configured to cause a partial reflection of the microwave pulse;

a fudicial member coupled to a proximal end of the antenna rod configured to generate a fudicial reference reflection in response to a microwave pulse;

microwave transceiver circuitry coupled to the antenna rod configured to generate and receive microwave pulses; and computation circuitry configured to calculate piston position as a function of a time delay in microwave pulses reflected from the sliding member, the computation circuitry including a digital computation device configured to digitally process a signal received from the microwave transceiver.

38. The apparatus of claim 37 wherein the computation circuitry controls operation of the microwave transceiver.

39. The apparatus of claim 38 including a digital to analog converter configured to convert a digital output from the computation circuitry to an analog signal which controls operation of the microwave transceiver.

40. The apparatus of claim 37 wherein the computation circuitry controls a scan range of the microwave transceiver.

41. The apparatus of claim 37 wherein the computation circuitry controls a resolution of the microwave transceiver.

42. The apparatus of claim 37 wherein the computation circuitry controls an update rate of the microwave transceiver.

43. The apparatus of claim 37 wherein the computation circuitry adjusts for a distance between the microwave transceiver and the antenna rod.

44. The apparatus of claim 37 wherein the computation circuitry controls a transmit power of the microwave transceiver.

45. The apparatus of claim 37 including a controller configured to provide a control signal to a hydraulic actuator as a function of piston position.

46. The apparatus of claim 37 including a programmable discrete input/output line.

* * * * *

UNITED STATES PATENT AND TRADEMARK OFFICE
CERTIFICATE OF CORRECTION

PATENT NO. : 6,722,261 B1  
DATED : April 20, 2004  
INVENTOR(S) : Gregory C. Brown et al.

Page 1 of 1

It is certified that error appears in the above-identified patent and that said Letters Patent is hereby corrected as shown below:

<u>Column 1,</u>  
Line 45, after "to" insert -- be --.

Signed and Sealed this

Twenty-first Day of September, 2004

JON W. DUDAS  
*Director of the United States Patent and Trademark Office*